April 4, 1950

V. KLÍMA 2,502,964

WINDING FOR COMMUTATOR MACHINES WITH LARGE OUTPUT PER POLE

Filed Feb. 14, 1948

Inventor:
Vilém Klíma,
by

April 4, 1950

V. KLÍMA 2,502,964

WINDING FOR COMMUTATOR MACHINES WITH LARGE OUTPUT PER POLE

Filed Feb. 14, 1948

Inventor:
Vilém Klíma
by Pane H Summer

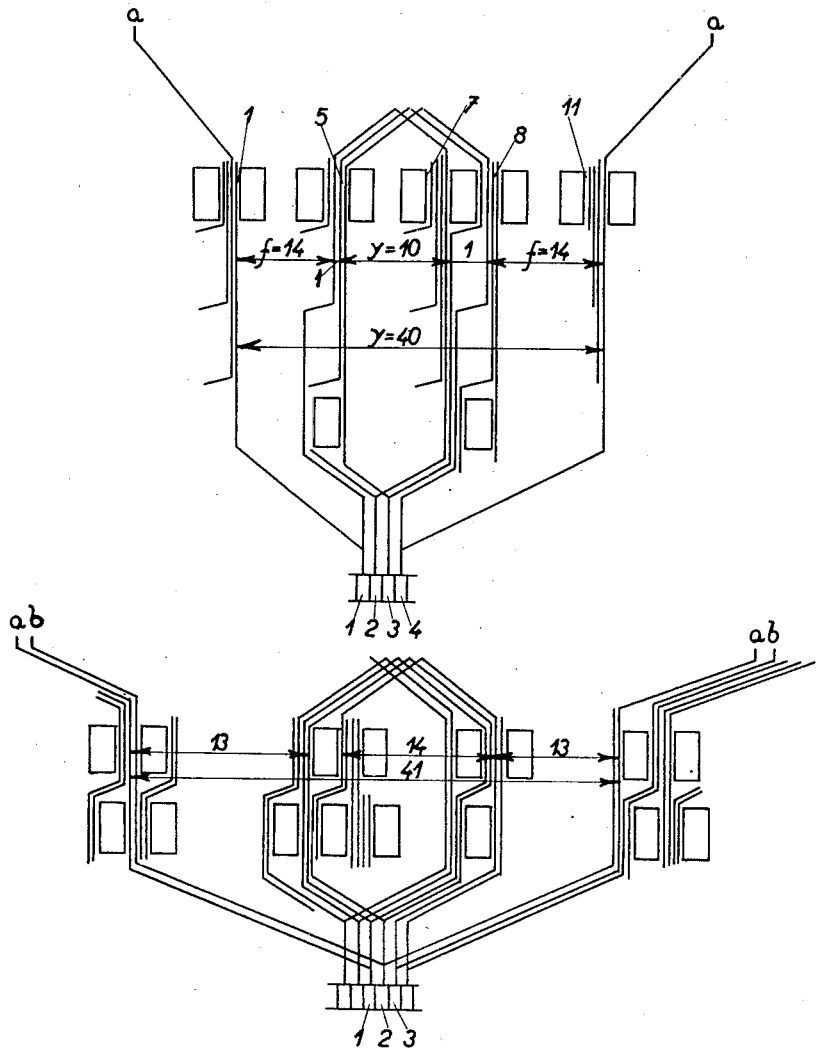

Patented Apr. 4, 1950

2,502,964

UNITED STATES PATENT OFFICE 2,502,964

WINDING FOR COMMUTATOR MACHINES WITH LARGE OUTPUT PER POLE

Vilém Klíma, Prague, Czechoslovakia, assignor of one-half to Moravian Electrical Engineering Works, National Corporation, Olomouc, Czechoslovakia Application February 14, 1948, Serial No. 8,435
In Czechoslovakia September 26, 1946

Section 1, Public Law 690, August 8, 1946
Patent expires September 26, 1966

7 Claims. (Cl. 171—206)

This invention relates to commutator type dynamoelectric machines, and more particularly, to such machines having a large output per pole and having windings with a number of parallel branches greater than the number of poles.

The commutation problems of such machines are difficult to solve satisfactorily, so that the output per pole of the machine is correspondingly reduced. Such difficulties arise, in part at least, from the reactance of the coils undergoing commutation. This reactance increases sparking at the commutator and the resultant wear and tear on the brushes.

In accordance with the present invention, the reactance of the coils undergoing commutation is decreased, and the output per pole of the machine is increased. The induced voltage features of a machine having a large number of slots are obtained, while the slot reactance is held to a value of the order of that characteristic of a machine having a small number of relatively broad slots, reducing the reactance voltage.

To achieve these advantages, the armature is divided axially into substantially equal sections by circumferential slots, and each section has the same number of circumferentially spaced, axially extending slots. Each slot receives a plurality of winding conductors, and the number of axial sections is equal to the number of the conductors per slot. Additionally, the correspondingly located slots in successive axial sections, going from one end of the armature to the other, are progressively offset circumferentially from each other by a distance equal to the slot width divided by the number of conductors per layer per slot. Specifically, if there are four conductors per layer per slot, there are four axial sections, and the corresponding slots in successive sections are circumferentially offset by one-quarter of the slot width.

The conductors are placed in the slots, with this arrangement, in such manner that they occupy a different circumferential position in each slot. For example, if there are four axial sections numbered 1 to 4, and four positions in each slot, numbered 1 to 4 clockwise, a given conductor will occupy position 1 in slot 1, position 2 in slot 2, etc. To effect this, the conductors originally in position 4 of slot 1 will occupy position 1 of the clockwise next adjacent slot in section 2, for example, and the conductor in position 3 of the slot in section 1 will occupy position 4 in the corresponding slot of section 2 and position 1 in the clockwise next adjacent slot of section 3, etc. In effect, the adjacent axial sections are successively rotated ¼ of the slot pitch, all in the same direction, relative to each preceding section, the example of four conductors per layer per slot.

With the foregoing in mind, it is an object of the present invention to provide a commutator type dynamoelectric machine having a high output per pole.

Another object is to provide such a machine having the advantages of both machines having a large number of relatively narrow armature slots and those having a small number of relatively wide armature slots, without any substantial disadvantages of either.

A further object is to provide such a machine having improved commutation and increased brush life.

These, and other objects, advantages and novel features of the invention will be apparent from the following description and the accompanying drawings.

In the drawings:

Figs. 6 and 7 are developed views of further embodiments of the invention.

Figure 1:
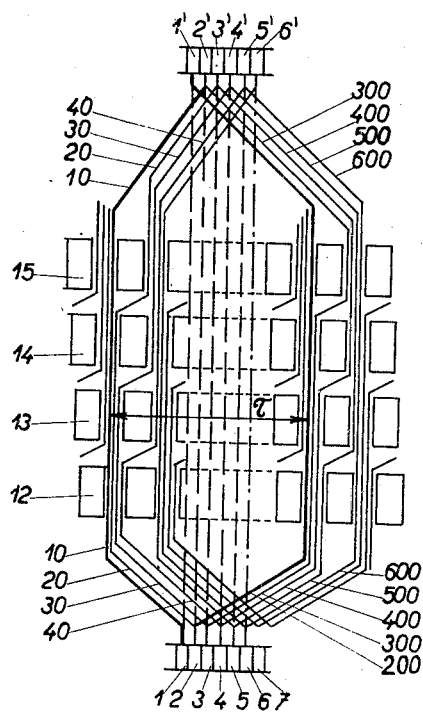
Fig. 1 is a developed view of an armature winding according to the present invention.
Figure 2:
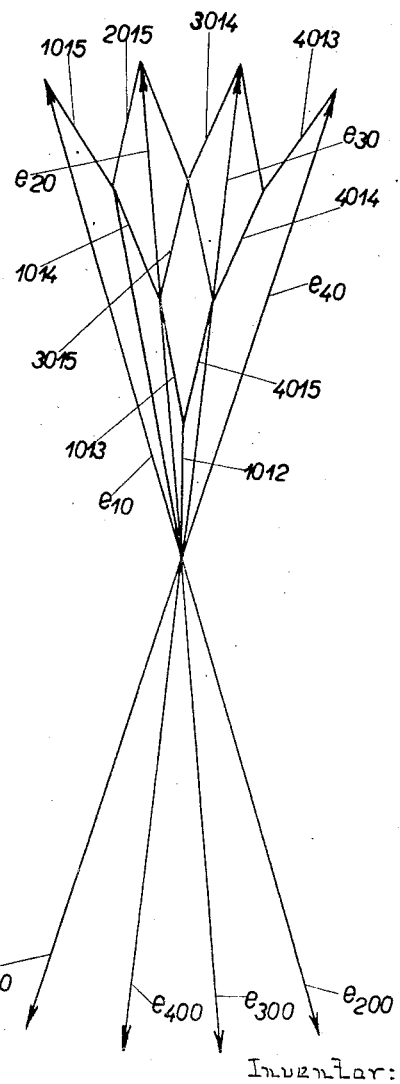
Fig. 2 is a vector diagram corresponding to Fig. 1.
Figure 3:
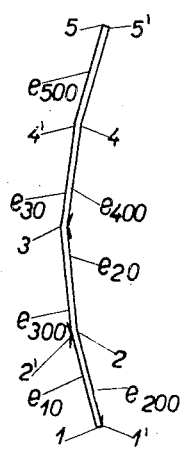
Fig. 3 is a vector diagram of the voltages of two adjacent conductors.

Referring to Figs. 1, 2 and 3, the armature of a commutator type dynamoelectric machine is illustrated as divided axially into four equal sections 12, 13, 14 and 15, the four sections equalling the number of conductors for each armature slot. Sections 12 through 15 are each formed with the same number of circumferentially spaced slots. Thus, each axial substantially aligned slot comprises four distinctive slots, one in each axial section. In accordance with the invention, the corresponding, substantially aligned slots in successive sections are rotated or offset by one-quarter of the slot width, or by the width of a slot divided by the number of conductors in one winding layer of the slot.

In Figs. 1, 2 and 3, the armature is illustrated as loop or wave wound, with the windings comprising conductors 10, 20, 30, 40 each series connected, respectively, to circumferentially spaced conductors 300, 400, 500 and 600. Each conductor, such as 10, 20, 30, 40 occupies a different relative position in the slot of the several axially spaced sections. Thus, conductor 10 is in the number 1 position in the first slot of section 12, in the number 2 position in the first slot of section 13, etc. Conductor 40, which is in the fourth position in the first slot of section 12, occupies the first position in the second slot of section 13, assuming displacement to the right in Fig. 1. The conductors 300 through 600 are correspondingly arranged.

1 through 7 and 1' through 7' represents the commutator sections. Conductors 20 and 500 are serially connected, and are correspondingly staggered circumferentially in passing from one slot to the corresponding slot in the next adjacent axial section 13. A conductor commonly connects conductors 20 and 500 to segment 2 of the commutator, and a second conductor commonly connects conductors 20 and 500 to segment 3' of the other commutator. The winding may be described as a double parallel loop (or wave) winding.

Assuming that the armature is associated with a stator with straight slots and that a sinusoidal field is produced in the stator; then in the conductor 10 part voltages are induced from the individual armature parts 12, 13, 14, 15, which are of the same magnitude, but are displaced in their phase, the phase displacement having a value corresponding to a quarter of the slot pitch. The different voltages induced in the armature parts are represented in Fig. 2 by the vectors 1012, 1013, 1014, 1015, which are rotated in respect of each other by an angle of ¼a, a representing the electrical angle between two adjacent slots. The sum of the vectors represents the voltage $e_{10}$ of the conductor 10. The voltage vector for the conductor 20 consists of three vector components, which are identical with 1012, 1013, 1014 and of an additional component 2015, which is rotated in respect of 1015 by the angle a. As can be seen, the voltage of the conductor 20 is equal to the voltage of the conductor 10. In a similar way also the voltage of the conductors 30 and 40 is equal and always displaced in its phase by ¼ of the whole phase difference of two adjacent slots. As far as the induced voltage is concerned, the effect of the new armature is as if there were an armature with a number of segments corresponding to the number of slots.

Another advantage of the arrangement according to the invention is to be seen in that the effect of the new armature is the same as of a machine with a large number of slots as far as the induced voltage is concerned (in the illustrated example the number of slots is seemingly quadrupled), but on the other hand the effect of the new armature with regard to the slot reactance is that of an armature with a small number of slots. This means that the slots are comparatively broad and that comparatively few conductors are subjected to commutation in them, so that with regard to the smaller magnetic conductivity of the broader slot the reactance voltage is reduced.

The arrangement has still another advantage which is to be seen in that during the current interruption of any of the coils there is always another coil in the corresponding part of the armature which at the same time has just commenced to commutate and therefore damps the switching process, that is, reduces the reactance voltage. During the commutation the reactance voltage has a direct current average value which reduces sparking and wear and tear of the brushes to a minimum.

If the winding according to the invention is performed as illustrated in Fig. 1, with such a pitch that two windings are produced with the same voltage as shown in Fig. 3, then $$e_{10} - e_{300} + e_{30} - e_{500} + \&c.$$

is the voltage polygon of the one winding and $-e_{200} + e_{20} - e_{400} + e_{40}$ &c. is the voltage of the other winding. As can be seen from Fig. 3 both polygons are consistent and identical, so that it is possible to connect together the segments 1 and 1', 2 and 2', 3 and 3' and so on, which are situated on opposite sides of the armature.

As can be seen from Fig. 1, the conductors 10 and 200, the first of which is connected to the segment 1 and the second to the segment 1', are at a distance from each other corresponding precisely to one pole pitch, as designated in Fig. 1 with the letter T (see the voltage vectors in Fig. 2). This is the condition for the possibility of connecting all winding ends of the rear parts 1', 2', 3', &c, to the front part of the winding 1, 2, 3, &c. in order to attain the so called bar commutation. Otherwise it is, of course, possible to carry out the winding with any desired pitch. The current commutator 1', 2', &c. can of course be omitted.

Figure 4:
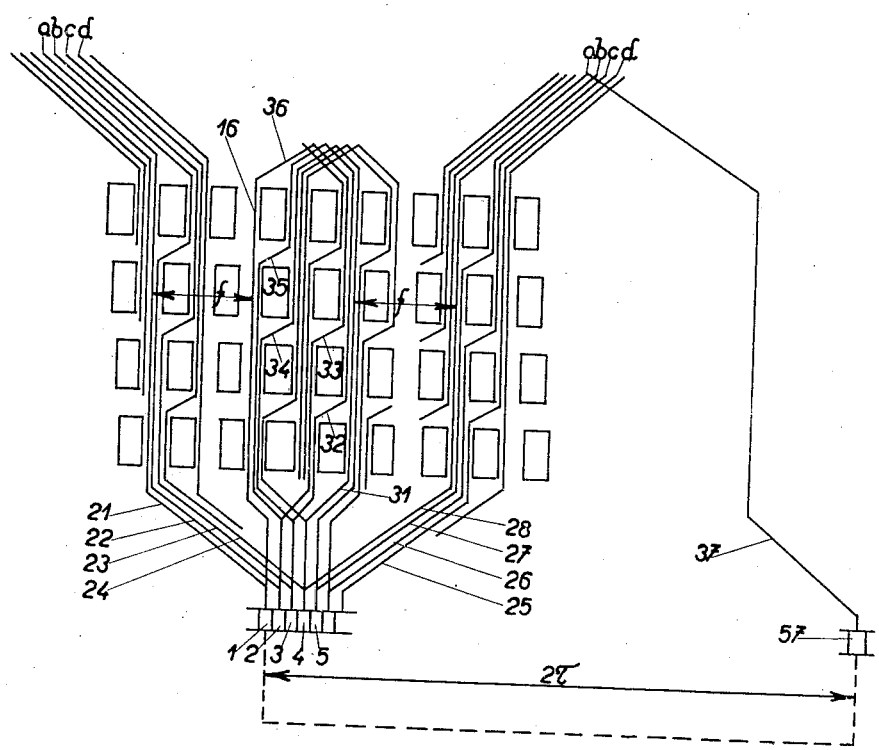
Fig. 4 is a developed view of another embodiment of the invention.

Great advantage is gained from the application of the winding which is represented in Fig. 4. This figure shows the view of a developed armature which has for instance 14 slots per 2 poles and 56 segments. In every slot there are therefore 8 conductors, 4 in each layer, which are connected into a wave winding with $$\frac{a}{p} = 3$$

that is into a treble parallel single closed winding.

In the illustration are shown several conductors 21 to 28 which are connected to the segments 1 to 7. The collector pitch $$y_k = \frac{k-a}{p} = 56 - 3 = 53$$

wherein $k$=the number of segments, the fractional pitches are $y_1=32$, $y_2=29$, or the winding is carried out with an extended pitch 32/28, that is electrically equivalent to a shortening to 24/28=6/7, thus resulting in a reduction of the harmonics with a six phase supply.

Another parallel loop winding is provided in the slots, and has a winding pitch $y_1=6$ and $y_2=5$, this winding being connected to the same segments. The winding is arranged in respect to the main winding in such a way that the conductor 31, connected to the segment 4, has the same distance $f$ from the conductor 28, which is also connected to the segment 4, as has the conductor 36, connected to the segment 1, from the conductor 21, which is connected to the same segment. Hereby the "circuit"—segment 4, conductor 28, point a, conductor 21, segment 1— forms a wave of the treble parallel main winding.

The points, designated with a, b, c, d, at the right and at the left, are identical points of a wave, if $p=1$; with a greater number of poles these are equipotential points. The conductors 36—33+35—32+34—31 form three loops connected to the segments 1, 2, 3, 4.

If we designate the voltage induced in a conductor as 50%, then the voltage induced between the segments 4 and 1 (in the conductors 28—37 or 28—21, as the conductor 37, leading to the segment 57, has the same voltage as the conductor 21, which leads to the equipotential segment 1) is $$100 \times \sin \frac{6}{7} 90° = 97.5\%$$

Figure 5:
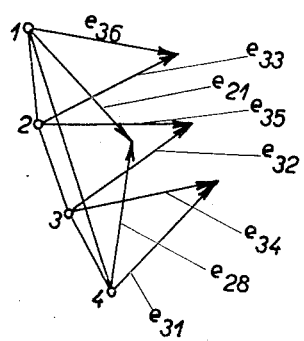
Fig. 5 is a vector diagram corresponding to Fig. 4.

This voltage is represented in Fig. 5 between the points 1 and 4, which correspond to the segments 1 and 4 (Fig. 4). The potential of the segments 3 and 2 is represented by the zenith points of a 36-sided polygon, which points are situated between the zenith points of this same polygon corresponding to the potential of the segments 4 and 1.

The segment voltage is 32.65% of the coil voltage with full winding pitch which is equal to the pole pitch T. The segment voltage, which would be produced in the loop winding alone, would have the same phase and would be 33.1%. Thus the connection to the same segments means very small equalising currents, which was impossible to attain with arrangements known hitherto as the slotting is too coarse.

An additional advantage of the arrangement according to the invention, illustrated in Fig. 4, is to be seen in that no equalising connections are needed between the equipotential connections, as for instance the segments 1 and 57 are connected through loops 36—36+35—32+35—31 and through the wave 28—37 which form a circuit in which the voltage, induced by the basic harmonic, is practically zero, so that the connection between 1 and 57 (illustrated in Fig. 4 with a dashed line) can be replaced.

As both windings have different factors for higher harmonics of the field, the harmonics are efficiently suppressed which is of advantage to the commutation.

The winding of Fig. 4 can be changed to a loop winding by bending the sets of end connections toward each other and interconnecting equipotential points.

The developed armature illustrated in Fig. 6 has 24 slots for each 2 poles, with 4 segments per slot and $a/p=3$, thus providing a triplex parallel winding. With the number of slots per pair of poles equal to 24 and the $a/p$ factor equal to 3, so that both have a common divisor, it is impossible to use a normal winding having equal segment voltages. But it is possible to carry out the winding according to Fig. 6, wherein the winding pitch of the main winding, if it is a loop winding, is $y_{1h}=40$ (that is from the first into the eleventh slot), or it is, in the case of a wave winding, $y_{1h}=56$. In both cases is $y_2=37$ and the pitch of the auxiliary winding is $y_{1p}=10$. The auxiliary winding is arranged precisely in the middle of the main winding coil. With the winding, illustrated in Fig. 6, the distance $f=14$ conductors. The voltage, derived from the main winding between adjacent segments, is $$\frac{1}{3} \sin \frac{40}{48} \cdot 90° = 0.322$$

times the voltage of the coil with an unshortened pitch. The same voltage, induced in the auxiliary winding, is $$\sin \frac{10}{48} \cdot 90° = 0.322$$

which is about exactly equal to the voltage mentioned before.

In Fig. 7 is represented still another winding according to the invention, which has 10.5 slots per pole, 4 segments per slot and $a/p=2$. The pitch of the main winding is $y_1=43$, $y_2=39$ (for a loop winding it would be $y_1=41$). The auxiliary loop winding has a pitch of $y_1=14$, $y_2=13$. The segment voltage of the auxiliary winding is $$\sin \frac{14}{42} \cdot 90 = 0.5$$

which corresponds almost exactly to the segment voltage of a double closed main winding. An advantage of this arrangement is that this number of slots could not be used with a winding according to the prior art.

In this case the armature is not sub-divided into four parts but only into two parts and the conductor transposition is carried out always with two conductors together. The voltage polygon of the main winding consists of two polygons with 42 sides each, said polygon being turned in respect to each other at one half of the angle of a side so that the segment voltages are practically equal, whereas the voltage polygon of the auxiliary winding comprises only 42 sides, so that equalising currents occur. This drawback is, however, not so grave that this construction should be regarded as impossible.

While specific embodiments of the invention have been shown and described in detail to illustrate the application of the principles thereto, it should be understood that the invention may be otherwise embodied without departing from such principles.

I claim:

1. In a commutator type dynamoelectric machine a rotor having a core divided into equal, axially spaced sections, each section having the same number of corresponding circumferentially spaced axially extending slots; a commutator having segments; and a multiplex winding connected to said commutator segments and including conductors in said slots, the number of conductors per slot being greater than two; the corresponding axially directed slots of succeeding core sections being successively offset circumferentially relative to the slots of the preceding section and the conductors, in the slots of successive core sections, occupying relative positions successively offset circumferentially relative to their positions in the slots of preceding core sections; the amount of offset of corresponding slots in adjacent sections being equal to the slot width divided by the number of slot positions each conductor is transposed in passing from one section to the succeeding section and the number of axial core sections being equal to the number of conductors per slot divided by the number of slot positions each conductor is transposed in passing from one section to the succeeding section.

2. A machine as claimed in claim 1 in which the number of sections equals the number of conductors per slot, and each conductor is transposed one position in each succeeding core section.

3. A machine as claimed in claim 1 in which each conductor occupying the last position in a slot is transposed to the first position of the next adjacent slot in passing from one section to the next succeeding section.

4. A machine as claimed in claim 1 in which the number of sections equals half the number of conductors per slot and each transposition involves two conductors each displaced two slot positions.

5. A machine as claimed in claim 1 including an auxiliary winding having conductors in said slots and interconnecting points of the multiplex winding through said commutator.

6. A machine as claimed in claim 1 in which said winding includes parallel sections, each connected to alternate segments of the commutator, and being equal in potential.

7. A machine as claimed in claim 1 including an auxiliary winding having conductors in said slots and interconnecting points of the multiplex winding through said commutator, one of the windings being a wave winding and other a loop winding.

VILÉM KLÍMA.

REFERENCES CITED

The following references are of record in the file of this patent:

UNITED STATES PATENTS

| Number | Name | Date |
|---|---|---|
| 1,747,941 | Langlois | Feb. 18, 1930 |
| 1,880,388 | Guerin | Mar. 4, 1932 |
| 2,371,962 | Lane | Mar. 20, 1945 |